Aug. 14, 1956  R. I. EYLER  2,758,696
WORK TRANSFER MECHANISM
Filed Sept. 30, 1954  2 Sheets-Sheet 1
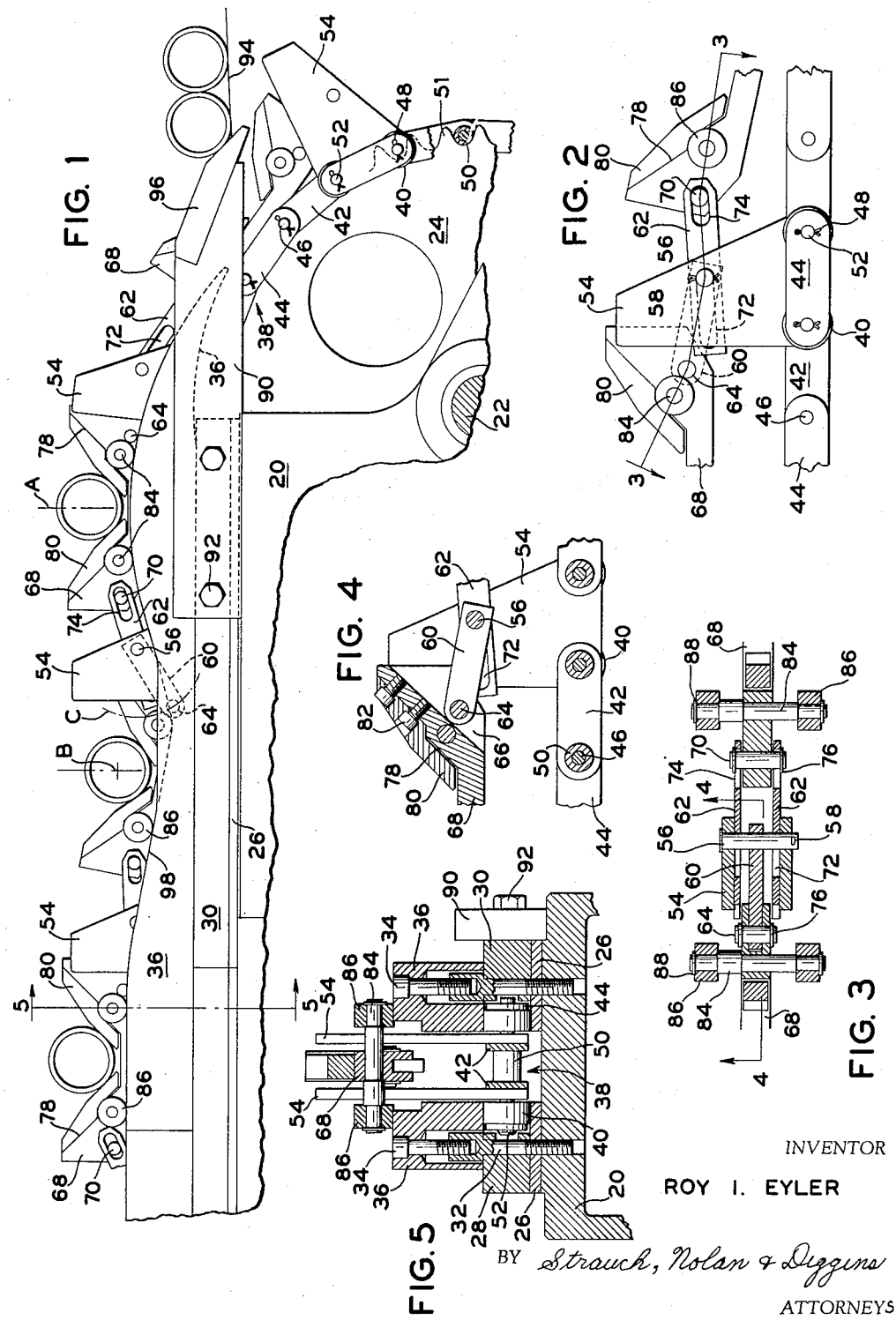
INVENTOR
ROY I. EYLER
BY Strauch, Nolan & Diggins
ATTORNEYS Aug. 14, 1956 R. I. EYLER 2,758,696
WORK TRANSFER MECHANISM
Filed Sept. 30, 1954 2 Sheets-Sheet 2

INVENTOR
ROY I. EYLER

BY Strauch, Nolan & Diggins
ATTORNEYS

United States Patent Office 2,758,696
Patented Aug. 14, 1956

2,758,696
WORK TRANSFER MECHANISM
Roy I. Eyler, Waynesboro, Pa., assignor to Landis Machine Company, Waynesboro, Pa., a corporation of Pennsylvania Application September 30, 1954, Serial No. 459,288

10 Claims. (Cl. 198—19)

This invention relates to work handling equipment and more particularly to means for transferring long cylindrical work pieces in a direction transverse to their longitudinal axes.

The device of the present invention is especially useful in automatic machines for performing multiple machining operations upon the ends of pipes wherein the work pieces are transferred laterally from station to station. A machine of this general type is shown and described in United States Patent 2,688,144 granted September 7, 1954.

In that machine the pipes to be operated upon are supported by parallel horizontal rails and are rolled along the rails from one operating station to the next by endless chains contained in the rails and driven by a hydraulically powered indexing mechanism. The fact that the pipes are permitted to roll on the rails has resulted in certain disadvantageous conditions.

When machining the ends of pipes it is essential that the length of the thread formed thereon be maintained uniform and accurate. Thus, in the above-mentioned machine, no axial movement of the work should occur between the end-locating station and the machining station. When the machine is adapted to operate upon both ends of a pipe at a single working station, with the longitudinal transfer eliminated, the pipe must be prevented from moving axially during its entire travel through the machine.

Under certain conditions it has been found difficult, in this prior machine to avoid axial movement of the work between stations. When a pipe rolls, the slightest bend will cause a certain amount of axial movement. Also, when the work rolls into the depressions in the rails at the working stations, especially if the work is small-diameter pipe, the work will bounce or whip and thus its ends are displaced from their proper positions.

Although carriers which positively grip the work as it is being transferred effectively prevent axial displacement of the work, the cost of grips of the required power and size and in the required number is prohibitive.

The transfer device of the present invention avoids these disadvantages by conveying the pipe from station to station without either permitting it to roll freely or positively gripping it. This is accomplished by providing carriers, integrated with the conveyor chains, which will support the pipe at all times except when it is seized by the machining units. Additionally, the novel mechanism will deliver the work piece always at the same level at a working station, regardless of the diameter of the work, a requirement dictated by the fact that the height of the operating station axis is necessarily constant. Further, the mechanism of the invention is designed to accommodate efficiently a wide range of sizes, including very heavy work.

Accordingly it is an object of the invention to provide means for conveying a long cylindrical work piece in a direction perpendicular to its longitudinal axis without gripping the work piece and without allowing it to roll.

Another object is to attach such means to an endless chain whereby work pieces can be automatically fed to and removed from said conveyor means and can be moved intermittently from one working station to another.

It is a further object of the invention to provide means whereby the work carrier may be raised or lowered as it is transferring the work so as to deliver work pieces of various diameters to a working station having a stationary axis.

A still further object is to provide for expansion between adjacent carriers so that they may be carried around the circumference of a sprocket along with the conveyor chain.

Another object of the invention is to provide mechanism of the above description which may be employed singly or in multiple at spaced points along the work piece as the length thereof requires.

It is also an object to provide mechanisms for transferring work pieces which are effective to positively and accurately support the work pieces without the use of grips and associated controls.

Other objects and advantages of the invention will be apparent from the following description and from the accompanying drawings in which:

Figure 1 is a fragmentary side elevation of a transfer mechanism constructed in accordance with the present invention;

Figure 2 shows a portion of Figure 1 on an enlarged scale;

Figure 3 is an approximately horizontal section taken along line 3—3 of Figure 2;

Figure 4 is a vertical section along line 4—4 of Figure 3;

Figure 5 is a transverse vertical section along line 5—5 of Figure 1;

Figure 6:
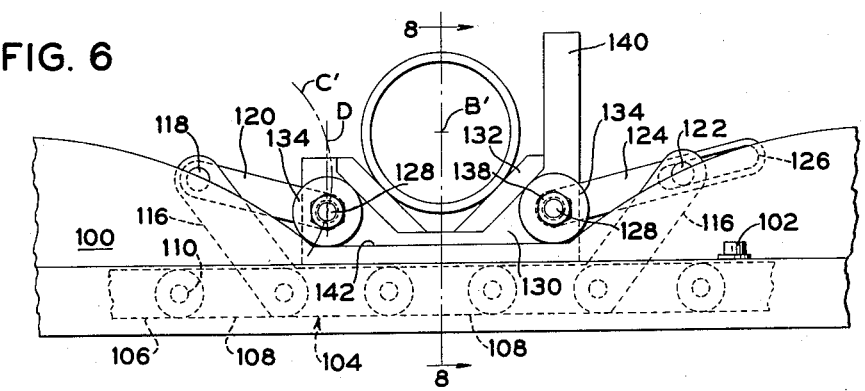
Figure 6 is a side elevation similar to a portion of Figure 1 but showing another embodiment of the invention.

Figures 1 and 5 show the top portion 20 of a typical pedestal employed to contain or support the work handling mechanism. For long work of the nature of pipes, at least two such pedestals are necessary, one near each end of the work. More may be installed in side-by-side relationship if required by the length of the work. A shaft 22 is journalled through all laterally adjacent pedestals and this shaft supports and drives in each pedestal a chain sprocket 24. Thus all chain sprockets 24 are intermittently rotated in unison by any known indexing mechanism such as that shown in the above-mentioned patent.

Two flat strips 26 are mounted on the top surface of the pedestal 20 and extend longitudinally thereof in parallel, spaced-apart relation. Two chain guides 28 and 30 are mounted on top of the strips 26 and arranged parallel thereto. The strips 26 and chain guides 28 and 30 are secured in position by the hexagon-headed screws 32 which pass through the guides and strips and threadedly engage the pedestal 20. The head of each screw 32 is internally threaded to receive a screw 34. Screws 34 attach to the assembly a pair of cam members 36. As is clearly evident in Figure 5, the members 26, 28, 30 and 36 form opposed longitudinal recesses to serve as a track for a conveyor chain 38, the rollers 40 of which are supported by the strips 26, are restrained against sidewise movement by the guides 28 and 30 and are prevented from lifting by the cam members 36.

The chain proper comprises the inside links 42 and outside links 44, which are joined by the short pins 46 and cotter pins 48 and which are maintained at proper lateral separation by the spacing rollers 50 which also serve to engage the teeth 51 of the sprocket 24. At suitable intervals along the chain 38—at every fourth link in the example shown—longer pins 52 are used to mount the rollers 40 and a pair of upwardly projecting lugs 54.

A headed pin 56, secured in position by a cotter pin 58 is journalled through each pair of lugs 54 and serves as a fulcrum for a plain link 60 and pair of slotted links 62 (Figures 2, 3 and 4). The plain link 60 is mounted centrally between the two lugs 54, extends to the left as seen in Figure 4, and is pivotally connected by a pin 64 in a recess 66 in one side of a cradle 68. The opposite end of cradle 68 is pivotally connected by a pin 70 to the next adjacent pair of slotted links 62, the cradle 68 being mounted on pin 70 between the two links 62. Each link 62 has a longitudinal slot 72 surrounding a pin 56 and a second slot 74 through which the pin 70 passes. Suitable spring retaining rings 76 may be employed to prevent axial movement of the pins 64 and 70.

Each cradle 68 is provided with a large V-shaped recess 78 lined by a pair of wear members 80 which are secured to the sides of the recess by screws 82 (Figure 4). The work pieces are supported upon the inclined sides of the wear members 80.

A pair of shafts 84 are press-fitted transversely in each cradle 68. Upon the opposite ends of each shaft 84 are journalled a pair of rollers 86 which are retained on the shaft by conventional spring retaining rings 88 (Figure 3). Axial movement of the rollers 86 is also prevented by suitable shoulders on the shaft 84. As shown in Figures 1 and 5, the rollers 86 serve to support the cradle 68 by rolling upon the top surfaces of the cams 36.

The sprocket 24 shown is disposed at the entrance end of the conveyor mechanism, it being understood that a similar sprocket is required at the exit end to reverse the chain 38 and return it to sprocket 24. A bar 90 (Figures 1 and 5) is secured to the outer surface of one of the chain guides 30 by means of screws 92 and extends beyond the sprocket 24 to a point adjacent skids 94 disposed at a slight angle to the horizontal. The pipes to be machined, as by chamfering, facing, threading or the like, are initially deposited upon the skids 94 and roll against the end member 96 secured to the bar 90. Here the foremost pipe is lifted from the skids 94 by one of the pairs of lugs 54 and is rolled into a rest position on the wear members 80 in the adjacent cradle 68. Thenceforward the pipe is supported and conveyed by the cradle without rotation.

In the further movement of sprocket 24 in the counter-clockwise direction, a movement which is intermittent as required and which is initiated by any suitable chain-indexing means (not shown), for example of the type shown in the aforesaid Patent 2,688,144, the chain 38 pushes the cradle 68 toward the left as seen in Figure 1 until it stops with the pipe centered on the line A. This line represents the station at which the correct axial position of the pipe is established by any suitable means. The pipe will thereafter remain in this correct axial position until it is discharged from the machine because of the absence of any relative movement between the pipe and its carrier.

The machine served by this transfer mechanism as shown for example in Patent 2,688,144 may comprise a number of working stations at which various operations are performed by machining tools. Usually such stations have in common the requirement that the pipe be delivered to a fixed point to be seized by grips which align its axis with that of a tool as, for instance, a thread cutting die head. The point B (Figure 1) is a representative of such a center. It is therefore required that the axis of the pipe arrive in substantial alignment with the point B at the end of an indexing stroke. It will be evident that, in order to accommodate a range of pipe sizes, the cradle 68 will occupy higher positions for the smaller sizes and lower positions for the larger diameters so that the axis of the pipe will always stop at the required point. This change in elevation is accomplished by providing a separate pair of cams 36 for each size of work and by forming a depression of the proper depth in the top surface of each cam. It will be seen that, although the chain 38 remains at a constant level, the links 60 and 62 permit the cradle 68 to assume any of a wide range of positions, due to the slots 72 and 74 which also have the function of permitting the distance between cradles to expand as the chain travels around the sprockets.

At the end of each indexing stroke one of the pairs of lugs 54 and therefore the pin 56 will come to rest in the same position occupied by similar parts at the end of the preceding stroke. Therefore, when the size of the pipe is changed, the position of the pin 64 will occupy a different position on the arc C, the position of pin 56 being constant. Thus a horizontal as well as vertical shift in the position of the pipe results if the cradle 68 is merely raised or lowered with both pairs of rollers 86 on the same level. To compensate for this horizontal shift and to bring the pipe axis to the proper lateral position, the cam 36 is formed with an inclination 98 as shown in Figure 1, tilting the cradle 68.

Another embodiment of the invention is shown in Figures 6 to 9 inclusive. The pedestal is again indicated by 20 and a pair of rails 100 is secured to the top surface of the pedestal 20 in spaced-apart relation by means of screws 102. An endless chain 104 is mounted upon sprockets (not shown) as before and passes between the rails 100. The chain 104 comprises inner links 106 and outer links 108, joined by chain pins 110 and cotter pins 112 and properly spaced on said pins by spacers 114.

Figure 7:
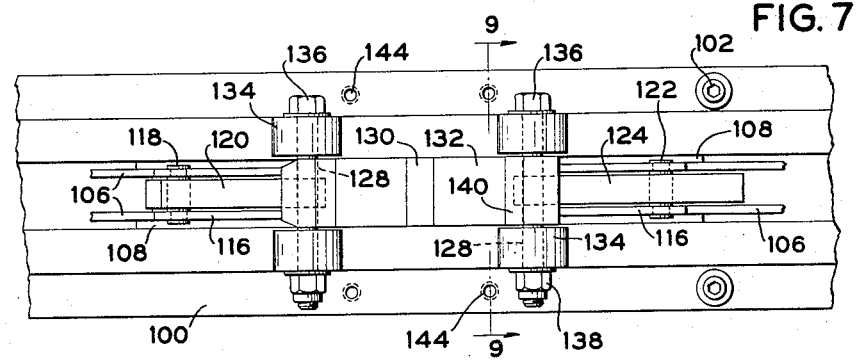
Figure 7 is a plan view of the portion of the mechanism shown in Figure 6.
Figure 8:
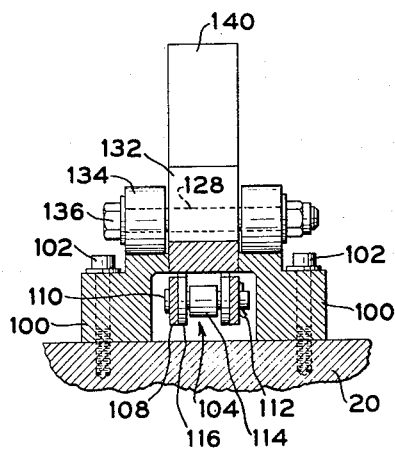
Figure 8 is a vertical section along line 8—8 of Figure 6.
Figure 9:
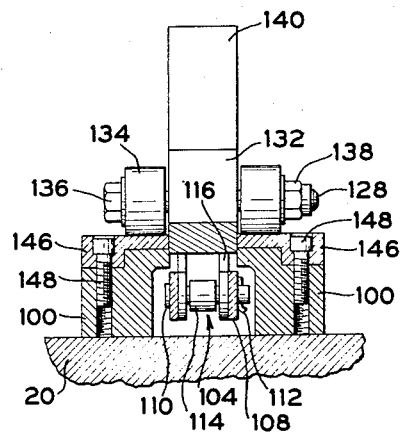
Figure 9 is a vertical section along line 9—9 of Figure 7, showing the mechanism adapted for smaller diameter work.

At intervals along the length of the chain 104, which intervals are substantially equal to the desired length of the index stroke, the inner links 106 are modified by being formed integrally with arms 116 which project upwardly at an inclination between the rails 100. As seen in Figures 6 and 7, the left hand link 116 is connected by pin 118 to a plain link 120 and the right hand link 116 is connected by pin 122 to a slotted link 124, pin 122 passing through an elongated slot 126 in the link. Between the opposite ends of links 120 and 124, and connected thereto by the shafts 128 is suspended a cradle 130, similar to the cradle 68 and having wear plates 132 which define a V-notch adapted to receive pipes of various diameters.

A pair of rollers 134 are also mounted on each shaft 128 externally of the cradle 130 and are positioned to ride upon the top surfaces of rails 100. The shafts 128 are restrained against axial movement by integral heads 136 at one end and by stop nuts 138 threaded upon the opposite ends. A single lug 140, integral with the cradle 130 replaces the lugs 54 of the previous embodiment.

In this instance, the cradle 130 is pulled by the chain rather than pushed, that is, the plain link 120 is forward of the cradle 130 in the direction of movement rather than behind it as is the case with the plain link 60. This eliminates the need for the chain guides since, in this construction, the chain cannot buckle. The rails 100 therefore are able to replace the cams 36.

Depressions 142 are formed in the rails 100 below the work forming stations. As before, the depth of the depression will vary according to the size of the pipe. Also as before a change in the height of the cradle 130 will be accompanied by a lateral shift if the cradle remains level because the axis of pin 118 is constantly at the same point while the axis of the shaft 128 to which the link 120 is connected may be at any point along the arc C'. It will be evident that, if the position shown of the axis of shaft 128 is suitable to accommodate the largest of the range of pipe diameters and if the point D corresponds to the position of the axis of shaft 128 when machining the smallest pipe size, then the maximum lateral shift of the cradle 130 for all sizes is equal to the width of the circular segment between 128 and D. In practice it has been found possible to ignore this lateral shift by placing the center of the machining tool halfway between the limits of the shift and permitting the gripping members to pull the slightly misaligned work piece into proper position. This permits the use of one pair of rails or cams for all diameters within the range, and the depressions 142 are consequently level.

However, it is necessary to alter the depth of the depressions 142 for the various work sizes. This is done by providing internally threaded openings 144 in the basic rails 100 adjacent the depressions 142 which are employed to attach strips 146 (Figure 9) by means of screws 148, thus raising the level of the cradle 130 when it is disposed at the working station B'.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for transferring elongated work pieces in a direction normal to their longitudinal axes comprising, a drive chain adapted to be moved in said direction; a cradle having surfaces adapted to support said work piece; linkage for attaching said cradle to said chain for movement therewith, said linkage being arranged to permit relative movement between said cradle and said chain in a direction substantially normal to the movement of said chain; and means for moving said cradle a predetermined amount in said direction substantially normal to the movement of said chain independently of said chain.

2. The apparatus according to claim 1 together with at least one work engaging lug movable with said chain behind said work supporting surfaces of said cradle and adapted to urge a work piece onto said surfaces.

3. Apparatus for transferring elongated work pieces to a work station in a direction normal to their longitudinal axes comprising, a transfer table, a drive chain, means for moving said chain along said table in said direction, a cradle having surfaces adapted to support said work piece, linkage means connecting said cradle and said chain, said linkage means being arranged to permit relative movement between said crade and said chain, means forming guide surfaces of varying height on said transfer table, and means on said cradles cooperating with said guide surfaces to move said cradles vertically with respect to said table as said cradle passes along said guide surfaces.

4. Apparatus for transferring elongated work pieces in a direction normal to their longitudinal axes comprising, a substantially horizontal transfer table, a drive chain having guide rolls, means for moving said chain in said direction across said table, a cradle having surfaces adapted to support said work pieces, guide rolls on said cradle, linkage means connecting said cradle and said chain, said linkage means being adapted to permit relative vertical movement between said cradle and said chain, and cam means on said table engaging the respective rolls on said chain and said cradle to guide said respective rolls and shift said cradle vertically with respect to said chain as said chain is moved across said table.

5. The apparatus of claim 4 wherein said guide rolls on said cradle are positioned at the front and rear thereof and said cam means is arranged to elevate one roller above the other at said work station.

6. Apparatus for transferring elongated work pieces in a direction normal to their longitudinal axes comprising a plurality of cradles having surfaces for supporting said work pieces, operating means adapted to move in said direction, linkage means connecting said cradles to said operating means for movement therewith, said linkage means being arranged to permit relative movement between said cradles and said operating means in a direction substantially normal to the direction of movement of said operating means, and means for moving said cradles in a predetermined amount in said direction substantially normal to the movement of said operating means independently of said operating means.

7. Apparatus for transferring elongated work pieces to a series of spaced work stations, at least two parallel and substantially horizontal rails forming a work transfer table extending between said stations, a series of cradles having surfaces adapted to support a work piece, at least two endless conveyors each having a portion adapted to pass along one of said rails, connecting means securing said cradles to said conveyors so that the spacing between said cradles substantially equals the spacing between said work stations, means for intermittently shifting said conveyors a distant substantially equal to the spacing between said work stations to thereby shift said work pieces from one station to the next adjacent station, said connecting means being adapted to permit relative vertical shifting movement of said cradles with respect to said conveyors, and means on said rails adapted to shift said cradles vertically in the region adjacent said stations.

8. The apparatus according to claim 7 together with work engaging lugs mounted behind said work supporting surfaces of said cradles and adapted to urge a work piece onto said surfaces.

9. Apparatus for transferring elongated work pieces to a work station in a direction normal to their longitudinal axes comprising, a transfer table; a drive chain; means for moving said chain along said table in said direction; a closed cam track extending along said table in said direction; cam followers on said chain adapted to engage said track to thereby prevent vertical displacement of said chain with respect to said track; lugs carried by said chain projecting upwardly therefrom; a cradle having surfaces adapted to support said work piece; a plurality of links connecting said cradle and said lugs, said links being pivotally mounted on said cradle and said lugs to thereby permit relative movement between said cradle and said lugs; means forming an additional upwardly facing cam track on said transfer table; and cam followers on said cradles adapted to ride along said additional cam track whereby the relative positioning of said cradles with respect to said chain is determined by said cam tracks.

10. Apparatus for transferring elongated work pieces to a work station in a direction normal to their longitudinal axes comprising, a transfer table; a drive chain; means for moving said chain along said table in said direction; means forming an upwardly facing cam track on said table extending in said direction; cam followers on said cradle adapted to ride along said cam track whereby the vertical position of said cradle is determined by said cam track; a pair of arms extending upwardly from said chain, respectively, ahead of and behind said cradle; and links pivotally mounted at their opposite ends respectively on the upper ends of said arms and on said cradle, the link connecting said cradle with the arm lying ahead of said cradle effecting a connection between said arm and said cradle of fixed length whereby said chain, said arm and said link cooperate to pull said cradle, said links being effective to permit said cradle to move vertically along said cam track independently of said chain.

References Cited in the file of this patent

UNITED STATES PATENTS 2,679,748   Kent _____ June 1, 1954